United States Patent
Hakoda et al.

(10) Patent No.: US 10,260,640 B2
(45) Date of Patent: Apr. 16, 2019

(54) VALVE APPARATUS

(71) Applicant: HONDA MOTOR CO., LTD., Tokyo (JP)

(72) Inventors: Koji Hakoda, Shioya-gun (JP); Tomoyoshi Koyama, Utsunomiya (JP); Hirotaka Otaki, Utsunomiya (JP); Tomohiko Hatakeda, Wako (JP); Satoshi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/440,262

(22) Filed: Feb. 23, 2017

(65) Prior Publication Data

US 2017/0248238 A1 Aug. 31, 2017

(30) Foreign Application Priority Data

Feb. 26, 2016 (JP) .................................. 2016-035682

(51) Int. Cl.
*F16K 1/36* (2006.01)
*F16K 25/00* (2006.01)
*F16K 1/42* (2006.01)
*F16K 31/06* (2006.01)

(52) U.S. Cl.
CPC ................. *F16K 1/36* (2013.01); *F16K 1/42* (2013.01); *F16K 25/005* (2013.01); *F16K 31/0655* (2013.01)

(58) Field of Classification Search
CPC ...... F16K 31/0655; F16K 1/42; F16K 25/005; F16K 1/36
See application file for complete search history.

(56) References Cited

U.S. PATENT DOCUMENTS

| | | | | |
|---|---|---|---|---|
| 1,245,516 | A * | 11/1917 | Scheelk | F16K 1/42 251/333 |
| 2,005,954 | A * | 6/1935 | Petersen | F16K 15/06 137/533.29 |
| 9,638,082 | B2 * | 5/2017 | Fujita | F16K 1/42 |
| 9,683,665 | B2 * | 6/2017 | Harada | F16K 1/526 |

FOREIGN PATENT DOCUMENTS

| | | | | |
|---|---|---|---|---|
| DE | 102015206467 | A1 * | 8/2016 | ........... F02M 61/188 |
| JP | 2013-50145 | A | 3/2013 | |

OTHER PUBLICATIONS

Machine Translation for DE102015206467A1.*

* cited by examiner

*Primary Examiner* — Ian G Paquette
(74) *Attorney, Agent, or Firm* — Westerman, Hattori, Daniels & Adrian, LLP

(57) ABSTRACT

In a valve apparatus, an annular contact portion made of elastic material is provided on a valve portion of a valve plug. A plurality of annular grooves are formed on a proximal end surface of a valve seat member which abuts against the contact portion. The annular grooves are formed around a communication hole through which fluid flows. The annular grooves have different diameters, and are concentric with one another.

4 Claims, 3 Drawing Sheets

VALVE APPARATUS

CROSS-REFERENCE TO RELATED APPLICATION

This application is based upon and claims the benefit of priority from Japanese Patent Application No. 2016-035682 filed on Feb. 26, 2016, the contents of which are incorporated herein by reference.

BACKGROUND OF THE INVENTION

Field of the Invention

The present invention relates to a valve apparatus having a valve plug movable in an axial direction, and which is configured to interrupt a communication state of a flow channel as a passage of fluid when the valve plug is seated on a valve seat surface of a body.

Description of the Related Art

Heretofore, valve apparatuses capable of switching a flow state of fluid flowing thorough a flow channel has been known. For example, in Japanese Laid-Open Patent Publication No. 2013-050145, a valve plug is provided inside a body so as to be movable in an axial direction, and the valve plug is coupled to a piston rod, while the valve plug can be seated on a valve seat provided inside the body. The valve seat is formed in a ring shape. A plurality of recesses are formed in a valve seat surface of the valve seat facing the valve plug. The recesses extend in a radial direction, and are arranged side by side in a circumferential direction.

When the valve plug is seated on the valve seat surface of the valve seat, flow of fluid through the inside of the body is interrupted. In a valve opening operation where the valve plug moves away from the valve seat, since the contact area between the valve seat and the valve plug is smaller owing to the presence of the plurality of recesses, sticking between the valve seat and the valve plug is prevented.

SUMMARY OF THE INVENTION

However, in the above valve apparatus, since the plurality of recesses are provided to extend in the radial direction, respectively, for example, in the case where a small scratch or a groove is formed between any of the recesses and the valve seat surface due to molding failure at the time of producing the valve seat or due to contact between the valve seat and the valve plug, leakage of fluid occurs when the valve apparatus is in a valve closed state because the fluid flows in the radial direction through the scratch or the groove. Consequently, by providing the recesses on the valve seat surface, though it is possible to prevent sticking of the valve plug in the valve opening operation, the seat performance in the valve closed state is degraded. Therefore, it is not possible to have both of the capabilities, i.e., preventing sticking of the valve plug and maintaining a desired seat performance.

A general object of the present invention is to provide a valve apparatus in which it is possible to maintain a desired seat performance when the valve plug is seated on the valve seat surface, and prevent sticking in the valve opening operation.

A valve apparatus according to the present invention includes a body including a flow channel as a passage of fluid, a valve seat surface facing the flow channel, a valve plug configured to be seated on the valve seat surface and configured to switch a communication state of the flow channel, and a drive part configured to move the valve plug in an axial direction. A plurality of annular grooves are formed on at least one of the valve plug and the valve seat surface which face each other, and the annular grooves have different diameters, and are concentric with one another.

In the valve apparatus of the present invention, a plurality of annular grooves are formed on at least one of the valve plug and the valve seat surface which face each other. The annular grooves have different diameters, and are concentric with one another. In comparison with the case where no annular grooves are provided, since the contact area between the valve plug and the valve seat surface is reduced, it is possible to prevent sticking at the time of valve opening operation from the valve closed state, and smoothly operate the valve plug. Further, even in the case where a scratch or a groove occurs in the valve seat surface for some reasons, such as molding failure, so that the adjacent annular groves are caused to communicate with each other by the scratch or the groove, since the annular grooves (and portions of the valve seat surface between the annular grooves) having different diameters are arranged in the radial direction concentrically, leakage of the fluid is prevented by portions of the valve seat surface that do not have any scratch or groove.

As a result, by providing the plurality of annular grooves having different diameters on at least one of the valve plug and the valve seat surface in a concentric manner, it is possible to prevent sticking at the time of valve opening operation, and also maintain a desired seat performance when the valve plug is in the valve closed state.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
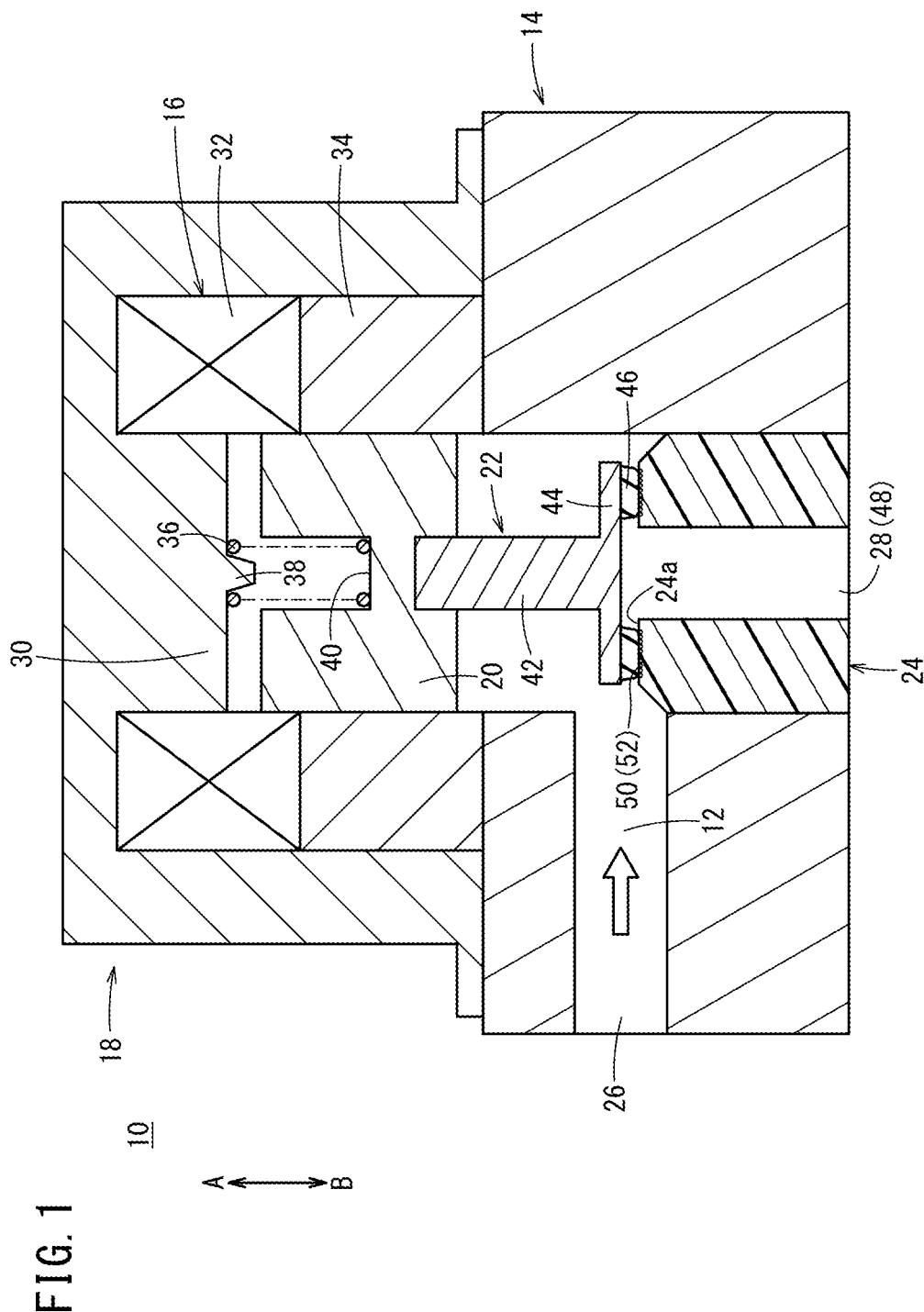
FIG. 1 is an overall cross sectional view showing a valve apparatus according to an embodiment of the present invention.

A valve apparatus 10 is used, for example, for switching the flow state of a fuel gas in a fuel cell system. As shown in FIG. 1, the valve apparatus 10 includes a body 14 having an internal flow channel 12 as a passage of fluid, a housing 18 provided on an upper portion of the body 14 and containing therein a solenoid part 16, a movable core 20 configured to move in an axial direction (indicated by arrows A and B) by excitation of the solenoid part 16, a valve plug 22 coupled to the movable core 20 and configured to switch a communication state of the flow channel 12, and a valve seat member 24 provided in the body 14 for allowing the valve plug 22 to be seated on the valve seat member 24.

Hereinafter, a side of the valve apparatus 10 where the housing 18 is provided will be referred to as a "proximal end side" (i.e., a side indicated by the arrow A), and another side of the valve apparatus 10 where the body 14 is provided will be referred to as a "distal end side" (a side indicated by the arrow B).

For example, the body 14 is made of metal material. The flow channel 12 bent in an L-shape in cross section is formed in the body 14. One end of the flow channel 12 communicates with a supply port 26 which is opened on a lateral side of the body 14, and the other end of the flow channel 12 communicates with a discharge port 28 which is opened toward the distal end side (in the direction indicated by the arrow B).

For example, the housing 18 is in a shape of a cylinder having a bottom. An opening end of the housing 18 is fixed to a proximal end surface of the body 14. The solenoid part 16 provided in the housing 18 includes a fixed core part 30 formed at the center of the proximal end of the housing 18, and protruding toward the body 14 (in the direction indicated by the arrow B), a coil 32 provided around the fixed core part 30, and a guide member 34 provided between the coil 32 and the body 14. Then, under excitation of the coil 32, the movable core 20 disposed so as to face the distal end of the fixed core part 30 is moved in the axial direction along the guide member 34. That is, the solenoid part 16 functions as a drive part for driving the movable core 20 and the valve plug 22 in the axial direction.

Further, a first spring receiving portion 38 is formed at the center of the distal end of the fixed core part 30. The first spring receiving portion 38 protrudes toward the movable core 20 (in the direction indicated by the arrow B), and the first spring receiving portion 38 is engaged with an end of a spring 36.

The movable core 20 is made of magnetic metal material, for example, and provided coaxially with the fixed core part 30. A second spring receiving portion 40 in the form of a recess is formed at the center of the proximal end of the movable core 20. The second spring receiving portion 40 is engaged with the other end of the spring 36 which is engaged with the first spring receiving portion 38 of the fixed core part 30. In this manner, the spring 36 is interposed between the distal end of the fixed core part 30 and the movable core 20. By elastic action of the spring 36, the movable core 20 is biased all the time in a direction away from the fixed core part 30, i.e., in the direction indicated by the arrow B.

Further, a main body 42 of the valve plug 22 described later is inserted in and coupled to the center of the distal end of the movable core 20. Thus, the movable core 20 and the valve plug 22 are provided coaxially, and move integrally with each other.

The valve plug 22 is made of metal material, for example, and includes the main body 42 in the form of a shaft formed at the proximal end side, a circular disk shaped valve portion 44 provided at the distal end of the main body 42 so as to face the valve seat member 24, and an annular contact portion 46 provided at an end surface of the valve portion 44. The valve plug 22 is provided movably inside the flow channel 12 in the body 14.

The contact portion 46 is made of elastic material such as rubber, for example. The contact portion 46 protrudes by a predetermined height from an end surface of the valve portion 44 toward the valve seat member 24 (in the direction indicated by the arrow B). The contact portion 46 has such a diameter that the contact portion 46 can be seated on a valve seat surface 52, to be described later, of the valve seat member 24. Further, when the contact portion 46 abuts against the valve seat member 24, the contact portion 46 is elastically deformed, and an end surface of the contact portion 46 becomes flat. The contact portion 46 may be made of resin material.

The valve seat member 24 is made of resin and molded into a cylindrical shape, for example. The valve seat member 24 is accommodated in the discharge port 28 of the body 14. The valve seat member 24 communicates with the flow channel 12 through a communication hole 48 extending through the center of the valve seat member 24 in the axial direction. That is, the fluid flowing through the flow channel 12 of the body 14 is discharged from the discharge port 28 through the communication hole 48 of the valve seat member 24 to the downstream side (in the direction indicated by the arrow B).

Figure 2A:
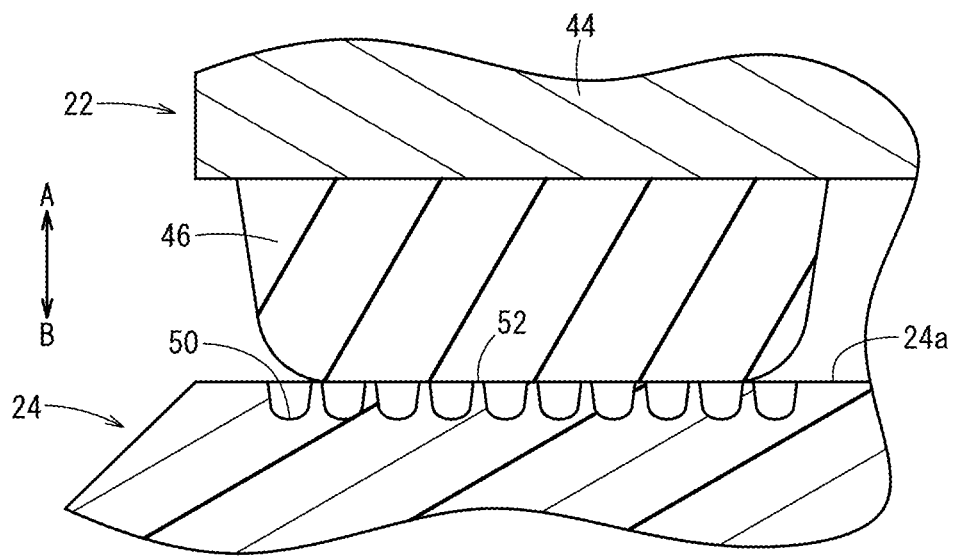
FIG. 2A is an enlarged cross sectional view showing an area around a contact portion of a valve plug in the valve apparatus in FIG. 1.
Figure 2B:
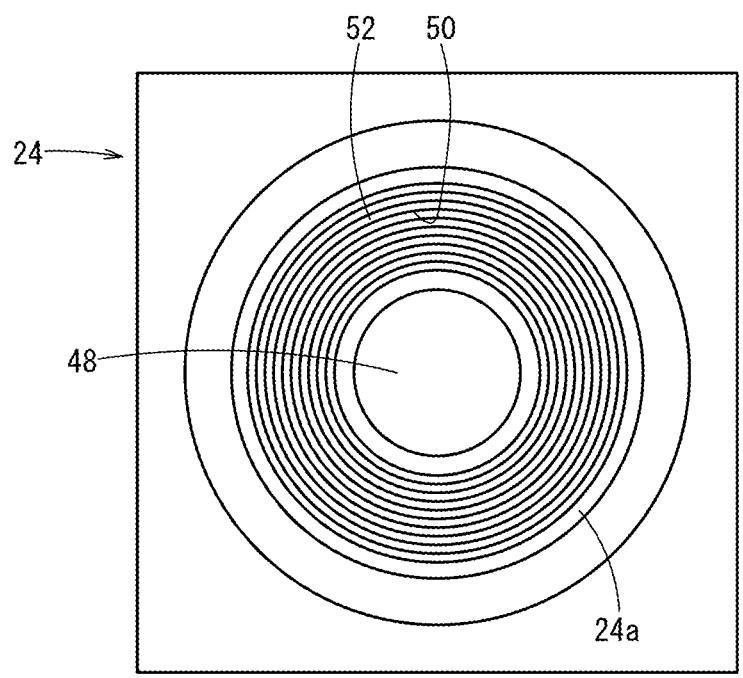
FIG. 2B is a plan view showing a valve seat member.

Further, as shown in FIGS. 1 to 2B, a plurality of annular grooves 50 are formed on a proximal end surface 24a of the valve seat member 24. The annular grooves 50 are recessed from the proximal end surface 24a by a predetermined depth, and comprise concentric circular grooves having different diameters around the communication hole 48.

The intervals between the annular grooves 50 in the radial direction are substantially the same. Between the adjacent annular grooves 50, respective surfaces are formed on which the flattened contact portion 46 of the valve plug 22 is seated. That is, the valve seat surface 52 is made up of a plurality of the surfaces formed in the same manner as the annular grooves 50. The surfaces forming the valve seat surface 52 have substantially the same width in the radial direction.

Further, the number and the diameter of the annular grooves 50 are not limited specially, and may be determined as necessary.

Further, the annular grooves 50 and the valve seat surface 52 are formed over an area which is slightly wider than the contact area of the contact portion 46 in the radial direction.

For example, a ridge pattern corresponding to the pattern of the annular grooves 50 is formed beforehand on a die used for molding the valve seat member 24, whereby the annular grooves 50 and the valve seat member 24 are formed at the same time.

The valve apparatus 10 according to the embodiment of the present invention basically has the above structure. Next, operation and working effects of the valve apparatus 10 will be described. The following description will be given in connection with the case where the valve apparatus 10 is used in the fuel cell system. In the following description, an initial state of the valve apparatus 10 is a valve closed state shown in FIG. 1 where the contact portion 46 of the valve plug 22 is seated on the valve seat surface 52 of the valve seat member 24, so that the flow of the fuel gas through the flow channel 12 is interrupted.

In the initial state, a fuel gas is supplied to the supply port 26 through a pipe from a fuel gas supply source (not shown), and the flow of the fuel gas in the flow channel 12 toward the discharge port 28 is interrupted since the valve plug 22 is seated on the valve seat member 24.

Then, the coil 32 of the solenoid part 16 is energized by a control signal from an electronic control unit (not shown) to thereby excite the coil 32. By the excitation of the coil 32, the movable core 20 is attracted and moved toward the fixed core part 30 (in the direction indicated by the arrow A) while compressing the spring 36. Thus, the valve plug 22 is placed in the valve open state where the valve plug 22 is spaced away from the valve seat member 24. In this regard, the valve seat member 24 on which the valve plug 22 is seated has the plurality of annular grooves 50 on the valve seat surface 52, and the contact area between the valve plug 22 and the valve seat member 24 is small in comparison with the case where the valve plug 22 contacts the entire valve seat surface 52. Therefore, when the contact portion 46 moves away from the valve seat surface 52, the contact portion 46 does not stick to the valve seat surface 52. Therefore, valve opening operation can be performed smoothly.

Consequently, the communication hole 48 of the valve seat member 24 is opened, and the fuel gas supplied to the flow channel 12 of the body 14 is discharged to the downstream side from the discharge port 28 through the communication hole 48.

In the case of interrupting the flow of the fuel gas through the valve apparatus 10, energization of the solenoid part 16 is stopped under control operation of an electronic control unit (not shown). As a result, the attraction force by which the movable core 20 is attracted toward the fixed core part 30 (in the direction indicated by the arrow A) is no longer applied. By the elastic force of the spring 36, the movable core 20 is biased toward the valve seat member 24 (in the direction indicated by the arrow B). As a result, the contact portion 46 of the valve plug 22 is seated on the valve seat surface 52, and the valve closed state is brought about. In this manner, the flow of the fuel gas toward the discharge port 28 of the body 14 is interrupted.

As described above, in the valve apparatus 10 of the embodiment of the present invention, the valve seat surface 52 of the valve seat member 24 on which the valve plug 22 is seated includes the plurality of concentric annular grooves 50 having different diameters around the communication hole 48 through which the fluid flows. At the time of valve opening operation from the valve closed state where the contact portion 46 of the valve plug 22 is seated on the valve seat surface 52, since the contact area is small in comparison with the case where the contact portion 46 contacts the entire valve seat surface 52, sticking of the contact portion 46 to the valve seat member 24 does not occur, and the valve opening operation can be performed smoothly.

Further, even in the case where a scratch or a groove occurs in the valve seat surface 52 for some reasons, such as molding failure of the valve seat member 24, so that the adjacent annular grooves 50 undesirably communicate with each other by the scratch or the groove, since the annular grooves 50 are arranged in the radial direction, the fluid flow is blocked by portions (surfaces) of the valve seat surface 52 that do not have any scratch or groove. Therefore, in the valve seat member 24, fluid communication between the outer portion of the valve seat surface 52 and the communication hole 48 at the innermost position is avoided.

That is, even in the case where a scratch or the like occurs on the valve seat surface 52, leakage of the fluid in the valve closed state where the valve plug 22 is seated on the valve seat surface 52 can be prevented reliably. Therefore, it is possible to achieve the stable seat performance.

Stated otherwise, since a labyrinth structure where the plurality of annular grooves 50 are arranged in the radial direction is adopted, it is possible to reliably seal the fluid in the valve closed state.

As a result, by proving the annular grooves 50 having different diameters on the valve seat surface 52 concentrically, sticking of the contact portion 46 to the valve seat member 24 at the time of valve opening operation of the valve plug 22 is prevented, and it becomes possible to achieve a desired seat performance in the valve closed state.

Further, since the valve seat member 24 is made of rigid resin material, even in the case where the annular grooves 50 are formed on the valve seat surface 52, deformation of the annular grooves 50 does not occur easily, and it is possible to achieve the stable seat performance. Thus, it is possible to suitably achieve the desired seat performance, while preventing occurrence of sticking.

Further, since the contact portion 46 is made of elastic material, it is possible to improve the seat performance when the contact portion 46 abuts against the valve seat surface 52 of the valve seat member 24. Moreover, it is possible to prevent occurrence of sticking owing to the annular grooves 50 formed on the valve seat surface 52.

Figure 3:
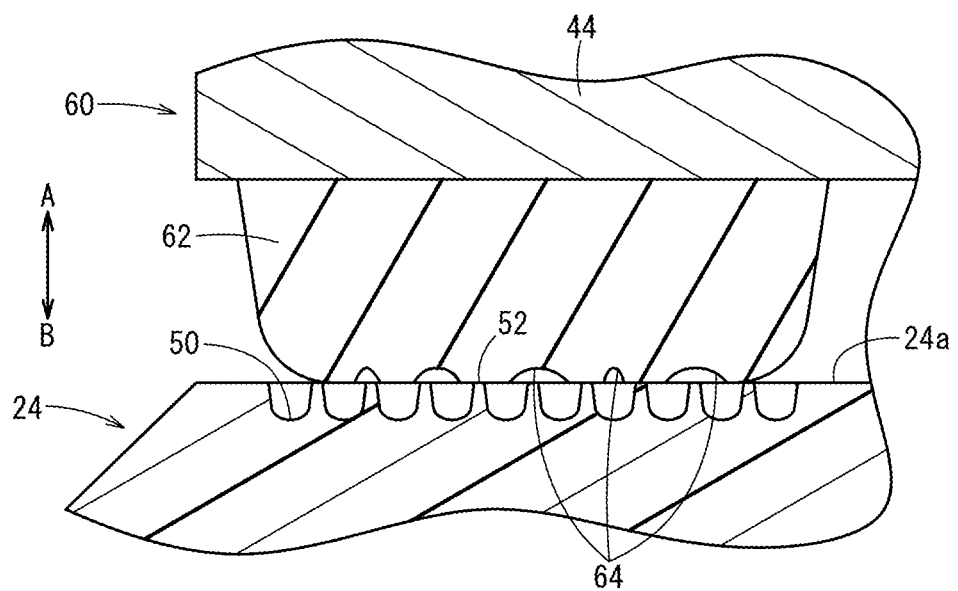
FIG. 3 is an enlarged cross sectional view showing an area around a contact portion of a valve plug in the case where a valve seat member according to a modification of the embodiment is used.

Further, the present invention is not limited to the case where the contact portion 46 of the valve plug 22 has a flat shape when the end surface of the contact portion 46 that faces the valve seat member 24 abuts against the valve seat member 24. For example, as in the case of a contact portion 62 of a valve plug 60 shown in FIG. 3, an end surface of the contact portion 62 facing the valve seat member 24 may have a plurality of recesses (recessed portion) 64, or the contact portion 62 may have a stain finished surface (uneven surface). In this manner, sticking of the contact portion 62 to the valve seat surface 52 can be prevented further reliably. Also in the case where the contact portion 62 has the recesses 64 or the stain finished surface, the recesses or the stain finished surface can be formed using a die at the time of molding the contact portion 62.

Further, as described above, the present invention is not limited to the case where the annular grooves 50 are formed on the valve seat surface 52 of the valve seat member 24. The annular grooves 50 may be formed on the contact portion 46 of the valve plug 22, instead of the valve seat surface 52.

The valve apparatus according to the present invention is not limited to the above described embodiment. It is a matter of course that various structures can be adopted without deviating from the scope of the present invention.

What is claimed is:
1. A valve apparatus comprising:
a body including a flow channel as a passage of fluid;
a valve seat surface facing the flow channel;
a valve plug configured to be seated on the valve seat surface and configured to switch a communication state of the flow channel; and
a drive part configured to move the valve plug in an axial direction,
wherein a plurality of annular grooves are formed on at least one of the valve plug and the valve seat surface which face each other, and the annular grooves have different diameters, and are concentric with one another,
wherein the annular grooves and the valve seat surface are formed over an area which is radially wider than a contact area between the valve seat surface and the valve plug seated on the valve seat surface.
2. The valve apparatus according to claim 1,
wherein the valve plug includes an annular contact portion protruding toward the valve seat surface, and the contact portion abuts against the valve seat surface.
3. The valve apparatus according to claim 1, wherein one of the valve plug and the valve seat surface is at least partially made of resin material; and
the annular grooves are formed on the one of the valve plug and the valve seat surface made of the resin material.
4. The valve apparatus according to claim 3, wherein the other one of the valve plug and the valve seat surface is at least partially made of elastic material, and a recessed portion is formed in the other one of the valve plug and the valve seat surface made of the elastic material.

* * * * *